United States Patent [19]

Hendrickson

[11] Patent Number: 4,716,937

[45] Date of Patent: Jan. 5, 1988

[54] FLOW LIMITING ASSEMBLY HAVING BREAKAWAY FEATURES

[76] Inventor: Donald W. Hendrickson, P.O. Box 999, Corona, Calif. 91718

[21] Appl. No.: 30,143

[22] Filed: Mar. 25, 1987

[51] Int. Cl.⁴ .............................................. F16D 1/02
[52] U.S. Cl. .......................................... 138/45; 403/2; 285/2; 220/89 A
[58] Field of Search .................. 138/45, 46, 40, 39; 52/98; 403/2; 248/548; 137/59, 60, 517; 285/2-4; 239/533.1; 220/89 A

[56] References Cited

U.S. PATENT DOCUMENTS

| | | | |
|---|---|---|---|
| 1,054,024 | 2/1913 | Orser | 137/60 |
| 1,134,882 | 4/1915 | Lowe | 137/60 |
| 2,282,641 | 5/1942 | Corey | 403/2 |
| 2,418,440 | 1/1945 | White et al. | 220/89 A |
| 3,630,474 | 12/1971 | Minor | 52/98 |
| 4,252,290 | 2/1981 | Willey | 403/2 |
| 4,585,210 | 4/1986 | Adams | 403/2 |
| 4,606,500 | 8/1986 | Mussler et al. | 285/2 |
| 4,610,432 | 9/1986 | Lewis et al. | 403/2 |

Primary Examiner—Henry J. Recla
Assistant Examiner—L. J. Peters
Attorney, Agent, or Firm—Knobbe, Martens, Olson & Bear

[57] ABSTRACT

A fitting having a weakened section therein is positioned between a flow control device and a water outlet such as a sprinkler head so that if the sprinkler head is subjected to a lateral blow, the fluid conduit will break at the weakened section, but yet the flow out of the broken conduit will be restricted by the flow control device.

18 Claims, 7 Drawing Figures

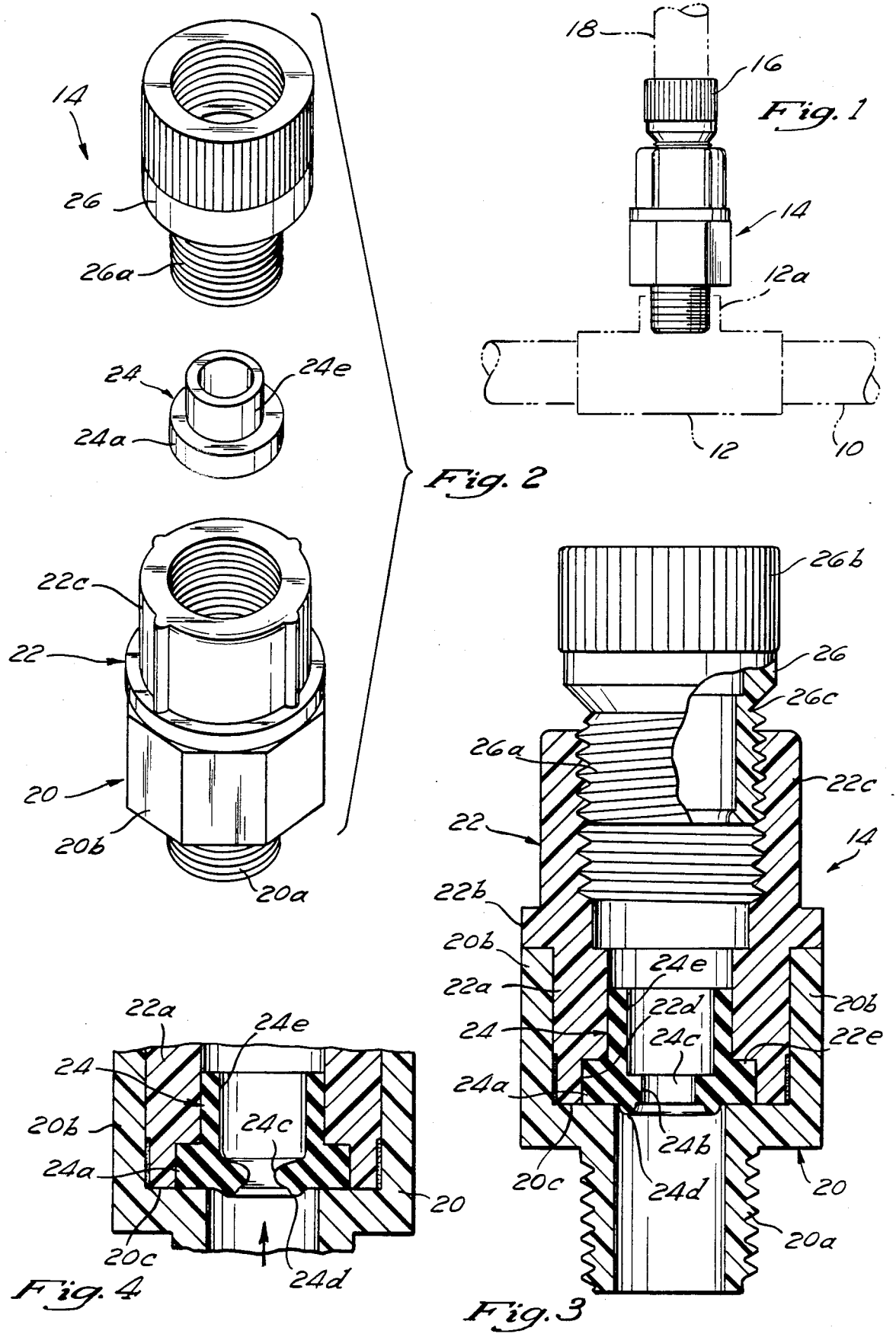

FLOW LIMITING ASSEMBLY HAVING BREAKAWAY FEATURES

FIELD OF THE INVENTION

This invention relates to sprinkler systems and more particularly to an arrangement for limiting water flow when a break occurs in a water line at or near a sprinkler head or other outlet.

BACKGROUND OF THE INVENTION

Water irrigation sprinkler systems typically include a network of tubes or pipes a short distance below the surface of the ground to be watered, and a series of vertical risers or other connections extend upwardly to the surface of the ground where a sprinkler head is positioned. In many instances, such as for watering shrubs, a tubular riser extends well above ground to situate a sprinkler head at a desired location. Frequently, the sprinkler head or the riser is subjected to a blow that causes a break in the riser or its connections. Often this occurs when a sprinkler head is hit by a lawn mower or other equipment. On other occassions, a sprinkler head will become dislodged or stolen.

Whenever a failure in the riser or removal of a head occurs, the volume of water escaping at that location greatly increases due to the fact that the sprinkler head normally has a very restricted outlet whereas the riser or connection below it has a much larger cross-section. As a typical expample, a sprinkler nozzle operating at 30 psi may provide four gallons of water per minute. However, the flow through a one-half inch riser connected to the nozzle will, at that same pressure, provide about 30 gallons per minute with the sprinkler head removed. This results in flooding and a waste of water at that location.

At the same time, the increased flow at the high volume flow location causes a decrease in pressure applied to all the other sprinkler heads on that line, such that there is inadequate watering at those locations.

If a failure of this type goes undetected, the resulting loss of water is significant, as is the damage because of lack of water at the other locations on that line. With the high use of automatic sprinkler systems wherein the actual site being watered may be uninspected for long periods of time the loss can be greatly multiplied.

Flow restrictors have been known for many years to provide a relatively constant output flow with a relatively wide range of input pressures. Such devices are positioned in any location within a fluid system wherein uniform flow downstream from that location is desired. U.S. Pat. No. 4,105,050 illustrates one type of flow restrictor positioned immediately adjacent to a sprinkler head. If the sprinkler head is removed or broken away the flow does not increase in the manner outlined above since the flow restrictor prevents the increase. This is desirable from a standpoint of preventing water loss and maintenance of adequate pressures at other sprinkler heads in that same line. However, if the riser or the pipe below the sprinkler head should break, there is a resulting undesired water loss; and many, if not most, breaks occur near the joints at the ends of the riser, and particularly at the connection to the horizontal water input line.

Accordingly, a need exists for providing a system that will solve the problem outlined above, by minimizing water loss when disruptions in sprinkler systems occur.

SUMMARY OF THE INVENTION

Briefly stated, the flow limiting assembly of the invention employs a flow restrictor in a flow line adapted to provide an output at a relatively uniform flow rate when subjected to a range of input fluid pressure. In the example illustrated, the restrictor is placed in a line leading to a sprinkler head or other such watering outlet. Preferably, the restrictor is positioned at the connection to the horizontal feeder line. A weakened section is provided in the conduit means which is between the flow restrictor and the outlet. With this arrangement a lateral blow to the sprinkler head or the conduit means that would be almost strong enough to break a conventional system, will cause the break to occur at the weakened section. Consequently, water flow will not materially increase if a break occurs.

In a preferred form of the invention, a special fitting is provided immediately adjacent to the flow restrictor, and whatever further riser or other connection is needed for the sprinkler head is joined to this special fitting. The fitting is formed with the weakened section. For example, the weakened fitting has a wall thickness on one end which is thinner than the other end, so that the weak section is that portion of that thin wall which is not reinforced by the mating wall of an adjoining component.

In a variation of the foregoing, a flow restrictor is positioned within a special fitting immediately below or upstream of the weakened area of the fitting. For example, this fitting may be positioned at the top of a riser, with a bubbler or sprinkler head mounted on the other end of the special fitting.

The method of the invention includes positioning a weakened section in the connection between a flow restrictor and a downstream component such as a sprinkler head or other water outlet, so that if the sprinkler head is hit hard enough to break the line the break will occur at the weakened section, leaving the restrictor intact to limit flow.

SUMMARY OF THE DRAWINGS

FIG. 1 is a side elevational view of the flow limiting assembly of the invention, with its environment shown in phantom lines.

FIG. 2 is an exploded perspective view of the components of FIG. 1.

FIG. 3 is a cross-sectional view of the components of FIG. 1.

FIG. 4 is a cross-sectional view of the flow restrictor with a significant pressure differential applied across it.

DETAILED DESCRIPTION OF A PREFERRED EMBODIMENT OF THE INVENTION

Figure 5:
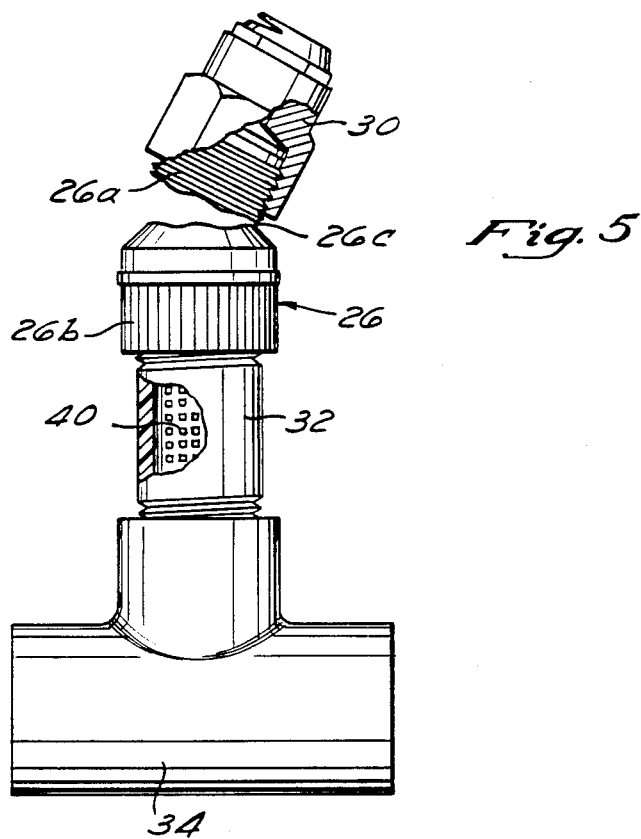
FIG. 5 is a side elevation, partially sectional view of another form of the invention after a break in the line has occurred.

There is shown in phantom lines in FIG. 1, a typical horizontal feeder line of a sprinkler system at the location where a vertical riser is to be positioned for connection to a sprinkler head above the surface of the ground. This includes horizontal feeder line 10 connected to a T-shaped coupling 12 that is threaded internally on its vertical leg 12a, although it could also be otherwise threaded or provided with a connection to be glued. Also shown is a flow restrictor assembly 14 together with the special fitting 16 of the invention above it and a portion of a riser 18 shown in phantom lines.

Referring now to FIGS. 2 and 3 as well, the flow restrictor assembly 14 is of a type similar to that shown in the above-referenced U.S. Pat. No. 4,105,050. It is intended to represent a variety of known flow restrictor devices that could be utilized at this location. The assembly includes a housing or fitting 20 having a lower, externally threaded male portion 20a which threads into the upper end of the T-shaped fitting 12a. Further included is an upper enlarged cylindrical female portion 20b having an internal shoulder 20c.

Fitting within this female portion 20b is a mating housing or fitting 22 having a cylindrical male lower end 22a which fits within the fitting portion 20b with its lower end engaging the outer portion of the shoulder 20c. The fitting 22 further includes an outwardly extending flange 20b which engages the upper end of the fitting 20. The upper portion 22c of the fitting 22 has a cylindrical threaded interior.

The inner lower portion of the fitting portion 22a has an enlarged inner diameter that creates an annular recess 22d and a shoulder 22e facing the shoulder 20c. Captured within this recess is an outwardly extending annular flange 24a of a cylindrical flow restrictor 24. The flow restrictor is captured by the fittings 20 and 22 by virtue of its flange 24a being compressed between the shoulder 20c and 22e.

The flow restrictor further includes an inwardly extending annular flange 24b which defines an interior orifice 24c. Further, the flow restrictor includes an upstream axially extending annular flange or bead 24d that extends into the passage to the fitting section 20a. The flow restrictor also includes an elongated cylindrical portion 24e formed integral with the annular flange 24a and extending upwardly, which is a downstream direction, positioned snugly in the fitting portion 22a. The inner diameter of the orfice 24c through the flow restrictor flange 24b is the smallest opening through the conduit formed by these components. The flow restrictor is preferably formed of an elastomeric material, whereas the fittings 20 and 22 are preferably formed of a rigid plastic.

Positioned within the upwardly extending fitting portion 22c is an adaptor fitting 26 which has a lower outwardly threaded male section 26a which threads into the fitting section 22c. The upper end of the adaptor 26 forms an internally threaded female section 26b which is adapted to receive the riser tube 18. Of course, a sprinkler head or other such element may be connected directly into the adaptor 26, if desired.

In accordance with the invention, a weakened section is provided in the portion of the conduit that extends between the flow restrictor 24 and the sprinkler head or other outlet device. In the arrangement shown the weakened section is formed in the adaptor 26. More specifically it is formed at the last groove or thread 26c on the portion 26a which is adjacent to the upper portion 26b. This last thread 26c has a deeper root than the other threads. That is, the outer diameter of the root is smaller than the outer diameter of the roots of the other threads. This creates a thin-walled section. Consequently, if the adaptor 26 receives a lateral blow of a certain size, the fitting will break at the location rather than some other location. Correspondingly, if the sprinkler head is struck with a proportionally sized blow, the break in the line will occur at that weakened section of the adaptor.

The flow restrictor 24 is shown in FIG. 3 in its shape without any water pressure applied to it. If however the line is under pressure, the flow restrictor will distort into the shape such as that shown in FIG. 4 causing its orifice to reduce in size. This causes reduced flow from what would exist if the flow restrictor maintained the same size shown in FIG. 3.

Assume that a sprinkler head is positioned above the flow restrictor, that is downstream, and that the flow restrictor is in the condition shown. If a break between the flow restrictor and the sprinkler head should occur, such as at the weakened section in the adaptor 26, the orifice through the flow restrictor will normally further decrease slightly in order to maintain relatively constant flow, thus preventing flooding. In theory, flow could actually be stopped with a particular flow control device, but this would not occur during the practical pressure range, and the pressure that exists between the flow control device and the sprinkler head also has a bearing on this.

In one example of a prototype system, it was found that flow through a sprinkler head employing a flow control device of the general type illustrated increased from 2.7 gallons per minute at 20 psi to 5.42 gallons per minute with 100 psi. In this example, the pressure immediately adjacent to the sprinkler head increased from 16 to 64 psi. With the sprinkler head removed, the flow increased from 4.28 gallons per minute at 20 psi to 5.43 gallons per minute at 100 psi. In other words, with maximum pressure applied, the water flow would be no greater than if the sprinkler head was in place. By contrast, water flow through an unrestricted pipe riser having a one-half inch diameter ranges from 21 gallons per minute at 10 pounds line pressure to 30 gallons per minute at 20 psi.

Figure 6:
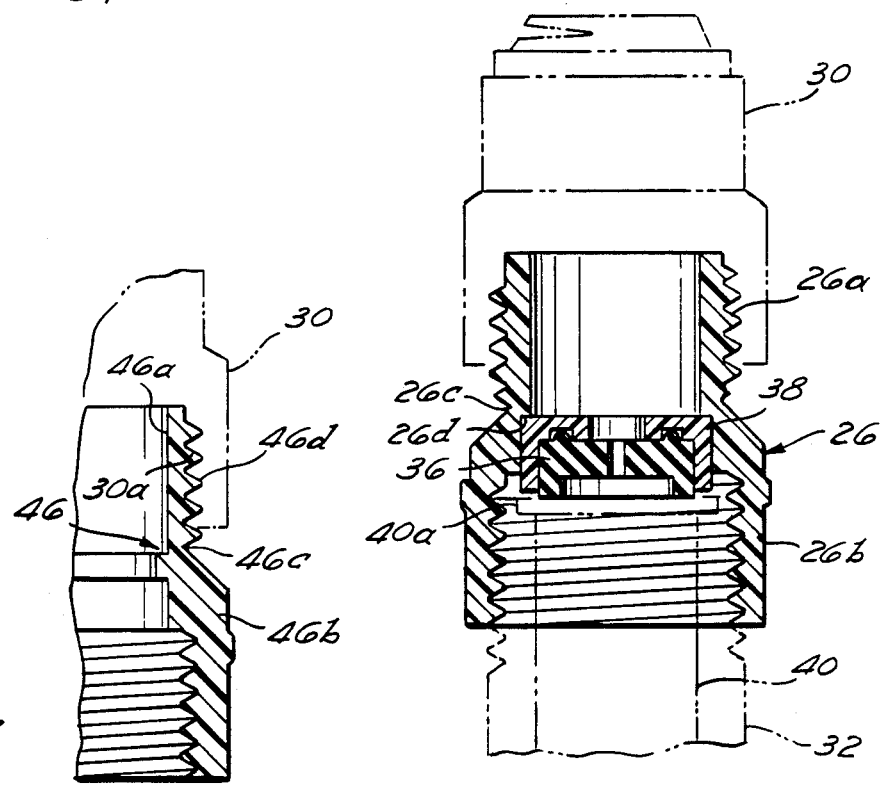
FIG. 6 is a cross-sectional view of a portion of the structure shown in FIG. 5.

In the variation of the invention illustrated in FIGS. 5 and 6, a fitting 26 is shown inverted from that shown in FIG. 3. A bubbler or other water outlet 30 is threaded on the exteriorly threaded male end 26a of the fitting 26, while the female end 26b, which is threaded on its interior, is mounted on the male upper end of a riser tube 32. The lower end of the riser is threaded into a T-shaped connection 34 of a fluid line.

A resilient flow regulator 36 is positioned within a casing 38 of harder plastic mounted within the fitting 26. More specifically, the casing 38 is retained against an upstream facing shoulder 26d in the fitting and an elongated screen 40 positioned in the riser 32. A flange 40a on the upper end of the screen is captured within the fitting thread end 26b, with the flange screen engaging the lower end of the regulator 36 and its casing 38. The regulator casing 38 fits snugly in the fitting, and the regulator 36 fits snugly in the casing, such that friction holds the regulator and casing in position. Also, in use, water pressure urges the flow regulator and its casing against the fitting shoulder 26d.

With the weakened section 26c of the fitting being above, which is downstream of the regulator, the weakened section will cause the fitting to break at that location if a lateral blow of sufficient size is struck against the bubbler. This broken condition is illustrated in FIG. 5. The flow from the broken fitting continues to be restricted by the regulator to a relatively constant level that will minimize the waste of water and will permit other components on the line to function normally.

Accordingly, it can be seen that the flow limiting assemblies of the invention accomplish the desired goal of conserving water if a failure occurs in the line leading to the sprinkler head or if the sprinkler head is removed. Also, while the pressure in the balance of the system remains undisturbed at an adequate pressure level for normal operation at the other locations.

While the weakened section 26c is formed at a certain location in a special fitting 26, it should be understood that the weakened section can be at any location in the fluid flow line or conduit downstream of the flow control device. Thus the weakend section can be in the fitting that houses the flow control device in FIG. 3; it can be in the riser tube in any location along its length; or it can be in the sprinkler head or other outlet itself. It is preferable, however, that the weakend section be in a separate fitting immediately adjacent to the flow control or the fitting can house the flow control. This is so because, as illustrated in the drawings, it may be desirable to use the flow control in situations where the weakend section is not felt necessary and there is then no need to fabricate special risers or other components having weakened sections. Also, with the weakened section in a fitting it is easy to merely replace that one fitting in the event of a break. The term "conduit means" is intended to relate to any conduit structure downstream of the flow control device including the flow control device including the ones illustrated as well as others not mentioned.

Figure 7:
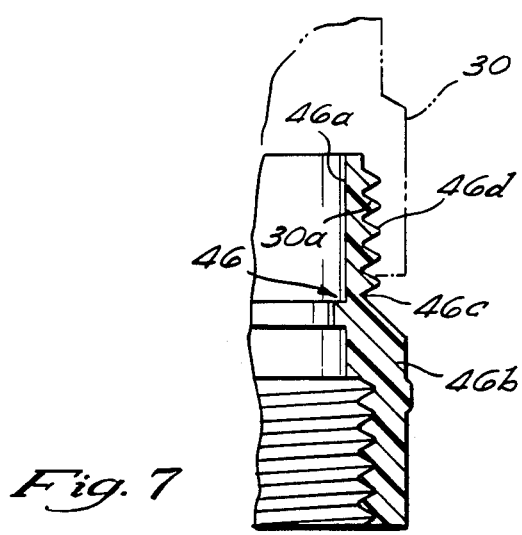
FIG. 7 is a cross-sectional view of a portion of the structure shown in FIG. 5.

FIG. 7 illustrates an alternative way of forming a weak section in a fitting, wherein the wall of the male end 46a of a fitting 46 is thinner than the wall of the female end 46b. In contrast to the fitting 26, the thread depth on the male end 46a is uniform throughout rather than with a deeper root on the last convolution of the thread. With a mating component such as a sprinkler outlet 30 mounted onto the fitting end, the thin wall section 46d is concentrically overlapped by an end 30a of the component 30, such that the adjacent portion 46c becomes the weak section of the assembled components. The fitting 46 can, of course, be used in the arrangement of FIGS. 1-4 or FIGS. 5 and 6.

What is claimed is:

1. A flow limiting assembly comprising conduit means having a flow control device therein adapted to provide an output at a relatively uniform flow rate when subjected to a range of input fluid pressures; said conduit means having a weakened section downstream of said flow control device, said section being weaker than the adjacent portions of said conduit means so that if the conduit means is subjected to a blow generally lateral to the conduit means, it will break at the weakened section rather than at some other location along the length of the conduit means.

2. The assembly of claim 1, wherein said conduit means includes a fitting having said weakened section formed therein.

3. The assembly of claim 2, wherein said fitting is connected adjacent to said flow control device.

4. The assembly of claim 3, wherein said fitting includes a portion to be threadably connected to a housing for said flow control device, and one of the threads of said fitting is deeper than the others so as to form said weakened section.

5. The assembly of claim 2, wherein said flow control device includes an elastomeric member captured within a housing, said housing includes a threaded downstream portion, and said fitting includes a threaded portion that mates with said housing downstream portion.

6. The assembly of claim 1, wherein said weakened section is in the form of an annular groove forming a thin-walled section of said conduit means.

7. The assembly of claim 1, wherein said conduit means includes a fitting having a tubular side wall on one end that is thinner thana tubular side wall on the other end so that when said thin wall end is connected to another component which concentrically overlaps a portion of said thin wall end, the portion which is not overlapped becomes said weakened section.

8. The assembly of claim 1, wherein said conduit means includes a fitting, said control device is positioned within said fitting, said weakened section is formed in said fitting.

9. The assembly of claim 8, wherein said fitting includes an internal shoulder facing upstream, said control device faces said shoulder, and said weakened section is adjacent to but downstream of said shoulder.

10. The assembly of claim 9, wherein the upstream end of said fitting is adapted to connected to a tubular riser, and the downstream end of said fitting is adapted to be connected to a water outlet device.

11. The assembly of claim 8, wherein the downstream end of said fitting is adapted to be connected to a water outlet device which concentrically overlaps a portion of said downstream end, and the wall of said downstream end is thinner than that of the upstream end, whereby the portion of said thin wall end which is not overlapped by said device becomes said weakened section.

12. A flow limiting assembly, comprising:
a flow control device adapted to provide an output at a relatively uniform flow rate when subjected to a range of input fluid pressures and having a water input end and a water output end;
a tubular riser having a water input and output end; and
a fitting connecting said flow control device output end to said riser input end, said fitting including a weakened section, said section being weaker than he adjacent portions of said fitting and riser, said section adapted to break in response to a lateral blow on the riser or said fitting rather than breaking upstream of the flow control device.

13. The assembly of claim 12, wherein said flow control device includes a flow control element, and a housing capturing said element, said housing having a threaded tubular downstream end, said fitting having a tubular upstream end which is adapted to threadably mate with the downstream end of said housing, and said fitting including a threaded tubular downstream end, said weak section being located at the downstream end of the threaded portion of the upstream end.

14. A flow limiting assembly, comprising:
a tubular riser adapted to be connected to a water supply;
a tubular fitting connected to the downstream end of said riser;
a flow controller captured within said fitting to provide substantially uniform flow output for a range of water pressure;
a water outlet connected to the downstream end of said fitting; and
said fitting having a weak section, said section being weaker than the adjacent portions of said fitting, said section being between the water outlet and said control device so that if the water outlet is struck a lateral blow, the fitting will break at the weak section rather than at some location upstream of said controller.

15. A method of limiting fluid flow, comprising the steps of:
 positioning a flow control device adapted to provide an output at a relatively uniform flow rate when subjected to a range of input fluid pressure, in a fluid flow line leading to a fluid outlet; and
 forming a weak section in said fluid flow line between said flow control device and said oulet so that if the outlet receives a lateral blow, the fluid flow line will break at said weak section rather than upstream of said fluid flow device.

16. The method of claim 15, wherein said flow control device is positioned in a fitting in said line, and said weak section is positioned in said fitting.

17. The method of claim 16, including the step of connecting one end of said fitting to a riser tube in said line and connecting the other end of said fitting to said outlet.

18. The method of claim 15, including positioning said weak section in a fitting in said line which is connected to a fitting holding said device.

* * * * *

UNITED STATES PATENT AND TRADEMARK OFFICE
CERTIFICATE OF CORRECTION

PATENT NO. : 4,716,937

DATED : January 5, 1988

INVENTOR(S) : Donald W. Hendrickson

It is certified that error appears in the above-identified patent and that said Letters Patent is hereby corrected as shown below:

Column 6, line 23, change the words "to connected" to --to be connected--

Column 7, line 13, change the words "said oulet" to --said outlet--

Signed and Sealed this

Twenty-fifth Day of December, 1990

Attest:

HARRY F. MANBECK, JR.

*Attesting Officer*  *Commissioner of Patents and Trademarks*